United States Patent [19]

Miyazawa

[11] Patent Number: 4,831,506

[45] Date of Patent: May 16, 1989

[54] DUAL PURPOSE LAMP ASSEMBLY FOR USE, FOR EXAMPLE, AS A COMBINED FOG AND CORNERING LAMP ON A MOTOR VEHICLE

[75] Inventor: Kenji Miyazawa, Shimizu, Japan

[73] Assignee: Koito Seisakusho Co., Ltd., Tokyo, Japan

[21] Appl. No.: 206,368

[22] Filed: Jun. 14, 1988

[30] Foreign Application Priority Data

Feb. 2, 1988 [JP] Japan ................................. 63-22417

[51] Int. Cl.$^4$ ............................................. F21V 7/06
[52] U.S. Cl. ................................. 362/284; 362/324; 362/346; 362/61
[58] Field of Search ................... 362/61, 80, 282, 283, 362/284, 287, 322, 324, 346, 420

[56] References Cited

U.S. PATENT DOCUMENTS

| | | | |
|---|---|---|---|
| 1,305,498 | 6/1919 | Schroeder | 362/284 X |
| 1,314,034 | 8/1919 | Winston | 362/284 |
| 1,632,127 | 6/1927 | Goodstein | 362/284 |
| 4,503,486 | 3/1985 | Makita | 362/61 |
| 4,663,696 | 5/1987 | Miyazawa et al. | 362/80 |

Primary Examiner—Ira S. Lazarus
Assistant Examiner—Peggy Neils
Attorney, Agent, or Firm—Browdy and Neimark

[57] ABSTRACT

A lamp assembly capable of functioning both as a fog lamp and a cornering lamp on a motor vehicle, comprising a fixed reflector within a housing, a movable reflector positioned forwardly of the fixed reflector, and a light bulb mounted to the fixed reflector and extending forwardly therefrom through an aperture in the movable reflector. The fixed reflector reflects the light rays from the bulb in the forward direction of the lamp assembly. Considerably less in size then the fixed reflector, the movable reflector pivots about a vertical axis between a first position, where it coacts with the fixed reflector to reflect the light rays forwardly in the use of the lamp assembly as fog lamp, and a second position where the movable reflector deflects part of the light rays toward one side of the lamp assembly to enable the same to server as cornering lamp. Being mounted to the fixed reflector so as to extend forwardly therefrom through the aperture in the movable reflector with minimal clearance, the light bulb hardly intercepts the light rays that have been reflected back from the movable reflector.

10 Claims, 8 Drawing Sheets

DUAL PURPOSE LAMP ASSEMBLY FOR USE, FOR EXAMPLE, AS A COMBINED FOG AND CORNERING LAMP ON A MOTOR VEHICLE

BACKGROUND OF THE INVENTION

This invention relates to electric lamps and particularly to a lamp assembly capable of throwing beams of light in either one or two different directions as required. Such a dual purpose lamp assembly lends itself to use as, typically, an integral combination of a fog lamp and a cornering lamp on a motor vehicle. More particularly, the invention concerns improvements in such dual purpose lamp assemblies of the type described and claimed in Miyazawa et al. U.S. Pat. No. 4,663,696.

The dual purpose lamp assembly according to the above referenced U.S. patent comprises a relatively large fixed reflector, a movable reflector of smaller size positioned forwardly of the fixed reflector for pivotal motion about a vertical axis, and a light bulb having a filament disposed at the common focus of the fixed and movable reflectors. The movable reflector pivots between a first position, where it coacts with the fixed reflector for reflecting the light rays from the bulb forwardly of the lamp assembly, and a second position where the movable reflector reflects part of the light rays from the bulb toward either side of the lamp assembly. Thus the lamp assembly functions as fog lamp when the movable reflector is in the first position, providing road illumination forwardly of the motor vehicle. Upon displacement of the movable reflector to the second position, on the other hand, the lamp assembly serves the additional purpose of cornering lamp to supplement the vehicle headlamp system by providing additional illumination in the direction of vehicle turn.

This prior art dual purpose lamp assembly has proved to have certain weaknesses arising from its mechanical construction. First of all, being positioned upstandingly in front of the fixed and movable reflectors, the elongate stem, in particular, of the light bulb inevitably intercepts part of the light rays that have been reflected from the movable reflector. Accordingly, the complete light energy emitted by the bulb has not been utilized for the intended purposes.

Another weakness is the lack of adaptability of the above outlined basic design of the prior art dual purpose lamp assembly for the manufacture of various commercial models having different sizes or shapes of lamp housings. This lack of adaptability also comes from the upstanding arrangement of the light bulb in front of the fixed and movable reflectors. If the vertical dimensions of the fixed and movable reflectors are altered each different commercial model, different means must be employed for mounting the bulb so that its filament may be positioned at the common focus of the two reflectors.

An additional inconvenience manifests itself in connection with the assemblage of the lamp assembly or in changing the used bulb. The inconvenience is again attributed to the upstanding arrangement of the bulb. This arrangement requires that the bulb be mounted in position by being inserted upwardly in and through aligned holes in the bottom flanges of the fixed and movable reflectors.

SUMMARY OF THE INVENTION

In order to overcome the listed weaknesses of the prior art, the present invention provides an improved dual purpose lamp assembly comprising a fixed reflector and a movable reflector positioned within a housing. Positioned forwardly of the fixed relflector, the movable reflector is pivotable between two preassigned positions either for emitting a light beam forwardly of the lamp assembly in coaction with the fixed reflector or for throwing a light beam toward one side of the lamp assembly. Also included is a light bulb mounted to the fixed reflector and extending forwardly therefrom through an aperture in the movable reflector so as to be optical alignment with the fixed and movable reflectors.

Thus, in accordance with the invention, the light bulb is mounted in alignment with the fixed and movable reflectors about a horizontal axis. The interception of the reflected light rays by the bulb, including the bulb stem, is thus reduced to such a level that the shadow of the bulb becomes hardly visible in the beam. Although the movable reflector must be apertured to permit such arrangement of the bulb, the resulting loss of its reflective surface area can be minimized by defining the aperture in the shape of a slot generally extending horizontally to permit the pivotal displacement of the movable reflector.

The invention offers another advantage in the manufacture of various sizes of commercial models based on the above improved design. No modification is required in the mounting means of the light bulb even if the vertical dimension of the movable reflector is altered. The mounting of the light bulb will also be expedited as the bulb aligns itself with the fixed and movable reflectors upon being mounted to the fixed reflector prior to installation within the lamp housing.

The above and other features and advantages of this invention and the manner of realizing them will become more apparent, and the invention itself will best be understood, from a study of the following description and appended claims, with reference had to the attahed drawings showing some preferable embodiments of the invention.

DESCRIPTION OF THE PREFERRED EMBODIMENTS

General

Figure 1:
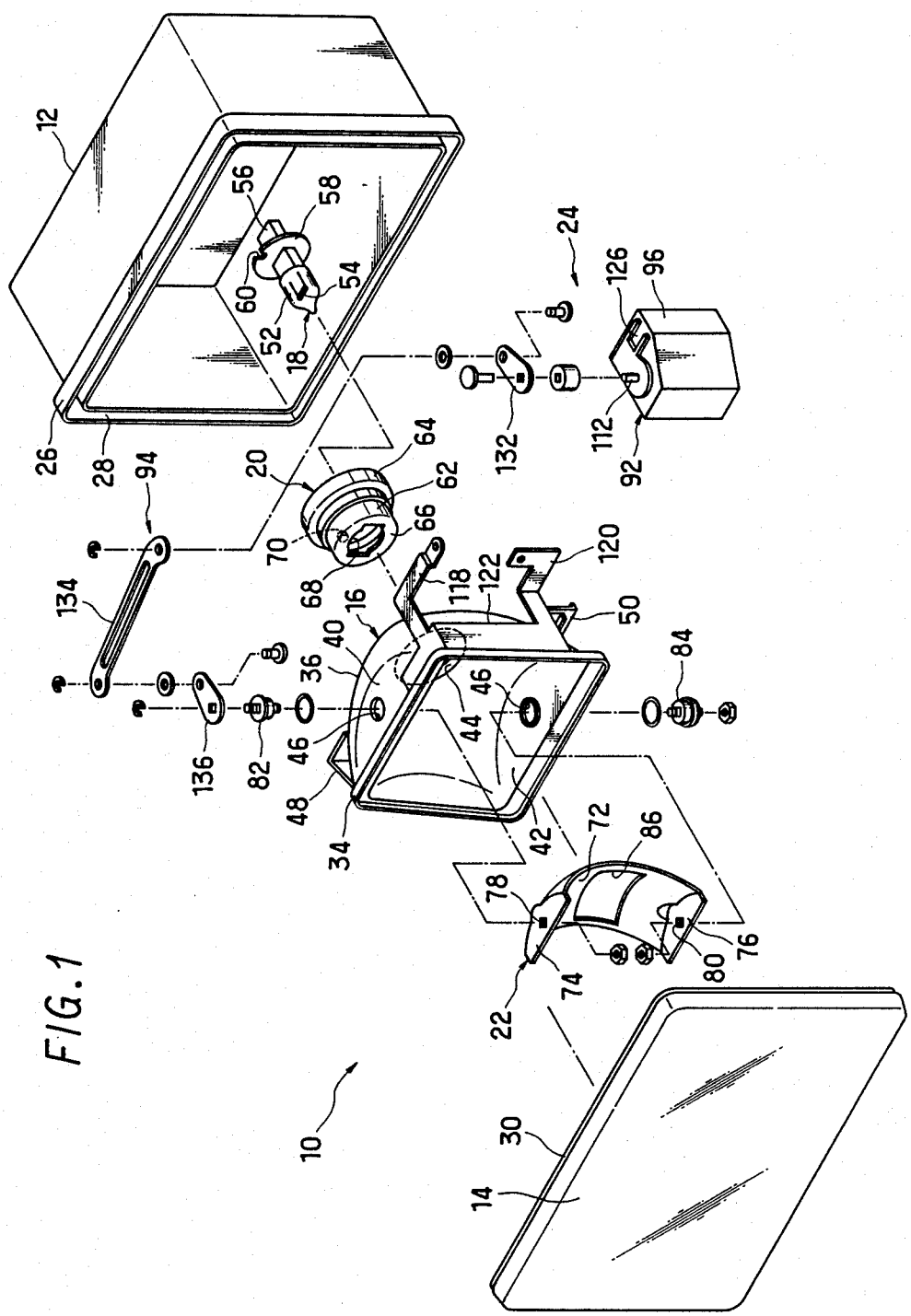
FIG. 1 is an exploded perspective view of the dual purpose lamp assembly constructed in accordance with the principles of the invention, the lamp assembly being herein shown as adapted for use as a combined fot and cornering lamp on a motor vehicle.

The dual purpose lamp assembly illustrated in FIGS. 1-7 represents an adaption of the invention for use on a motor vehicle as a combined fog and cornering lamp, to be installed on either side of the vehicle only with a minimum modification of construction. The general organization of the combined fog and cornering lamp assembly will become apparent from a study of FIG. 1. Generally designated 10, the lamp assembly broadly comprises:

1. A lamp housing 12 in the form of a box having an open front end closed by a lens 14.
2. A fixed reflector 16 immovably mounted within the housing 12.
3. A light bulb 18 mounted to the fixed reflector 16 via a bulb holder 20 and extending horizontally forwardly therefrom.
4. A movable reflector 22 disposed forwardly of the fixed reflector 16 and pivotable between a first or fog lamp position, where the movable reflector coacts with the fixed reflector 16 for reflecting the light rays from the bulb 18 forwardly of the lamp assembly 10, and a second or cornering lamp position angularly offset from the fog lamp position toward either side of the lamp assembly, where the movable reflector angles part of the light rays from the bulb toward that side of the lamp assembly.
5. A two way drive mechanism 24 mounted within the lamp housing 12 and mostly disposed behind the fixed reflector 16 for driving the movable reflector 22 between the fog lamp position and either of the two possible cornering lamp positions.

The following is a more detailed discussion of the listed components of the combined fog and cornering lamp assembly 10.

Lamp Housing

Figure 2:
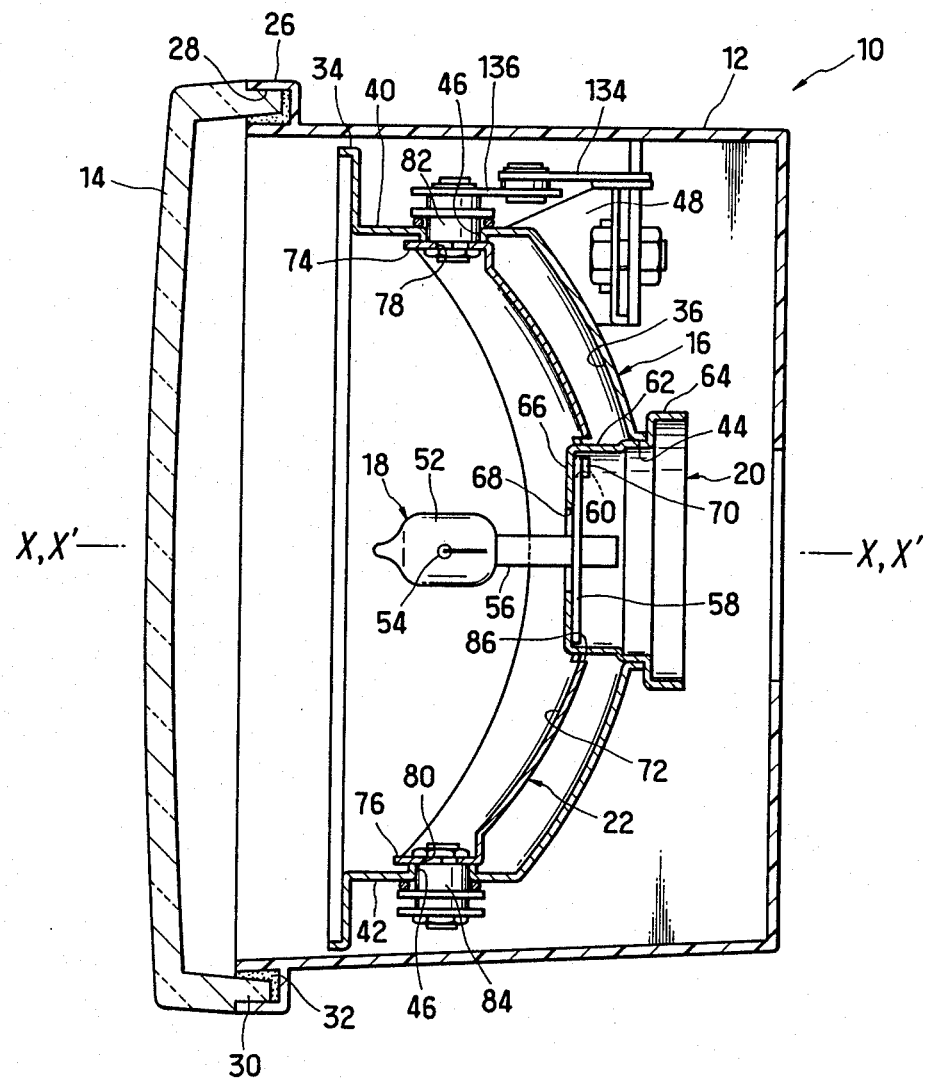
FIG. 2 is an enlarged vertical section through the dual purpose lamp assembly of FIG. 1.

As shown in both FIGS. 1 and 2, the lamp housing 12 is in the form of a box, rather elongated horizontally and opening forwardly of the lamp assembly. The front edges of the lamp housing 12 have L shaped flange 26 defining a continuous groove 28. The lens 14 has a peripheral rim 30 adapted to fit in the groove 28 in the lamp housing 12. A suitable adhesive 32 or the like may be employed for securing the lens 14 to the lamp housing 12.

Fixed Reflector

With reference to FIGS. 1-4 the fixed reflector 16 comprises a rectangular frame portion 34 disposed immediately behind the lens 14 and a reflective portion 36 displaced rearwardly of the frame portion. The frame portion 34 and reflective portion 36 are joined to each other via a pair of flat side portions 38, a flat top portion 40 and a flat bottom portion 42. All the listed parts of the fixed reflector 16 can be a one piece pressing of sheet metal, with at least the front face of the reflective portion 36 rendered reflective as by the vapor deposition of aluminum.

The reflective portion 36 is in the shape of a paraboloid of revolution; that is, the fixed reflector 16 is a paraboloidal reflector. The axis of this paraboloidal reflector consitutes the optical axis X—X of the lamp assembly 10. A hole 44 is formed centrally in the reflective portion 36 for mounting the light bulb 18 to the fixed reflector 16 via the bulb holder 20 in a manner set forth subsequently. The flat top portion 40 and bottom portion 42 also have a pair of smaller diameter holes 46 defined therein in vertical alignment, for use in pivotally supporting the movable reflector 22.

The fixed reflector 16 is secured to the lamp housing 12 via mounting flanges 48 and 50. The flange 48 is spot welded or otherwise secured to one of the flat side portions 38 of the fixed reflector 16. The other flange 50 is similarly secured to the flat bottom portion 42 of the fixed reflector 16 in the vicinity of the other of the flat side portions 38.

Light Bulb and Bulb Holder

Reference is also directed to FIGS. 1-4 for the detailed consideration of the light bulb 18 and the bulb holder 20. The light bulb 18 is of the conventional single filament type, comprising an envelope 52 of vitreous material, with a filament 54 enclosed therein, and a stem 56 having a mounting flange 58 formed thereon. The mounting flange 58 has a notch 60 formed in its periphery in a preassigned angular position thereon, for use in mounting the bulb 18 to the bulb holder 20 in proper angular position about its longitudinal axis.

The bulb holder 20 has a tubular portion 62 with an enlarged rear end 64 and an end plate 66 closing its front end. The end plate 66 is apertured 68 to permit the bulb envelope 52 to pass forwardly therethrough. A protuberance 70 is formed on the inner or rear surface of the end plate 66 for engagement in the notch 60 in the mounting flange 58 of the bulb 18.

FIG. 2 best indicates that the bulb holder 20 is inserted in and through the hole 44 in the fixed reflector 16 from its rear side until the enlarged rear end 64 of the bulb holder comes into abutment against the reflective portion 36 of the fixed reflector. The bulb holder 20 is secured to the fixed reflector 16, as by spot welding, in their relative positions of FIG. 2. The light bulb 18 can be mounted to the bulb holder 20 by being inserted, with its envelope 52 foremost, in and through the aperture 68 in the end plate 66 of the bulb holder until the mounting flange 58 on the bulb stem 56 comes to butt on the rear surface of the end plate 66. The bulb 18 may be turned about its own axis as required for receiving the protuberance 70 on the end plate 66 in the notch 60 in the bulb mounting flange 58. So positioned with respect to the bulb holder 20, the bulb 18 can be retained in position as suitable retaining means, not shown, urges the bulb mounting flange 58 against the bulb holder end plate 66.

Now the light bulb 18 has been mounted to the fixed reflector 16 via the bulb holder 20 in alignment about the lamp axis X—X. The midportion of the bulb filament 54 is at the common focus of the fixed reflector 16 and movable reflector 22.

Movable Reflector

Figure 3:
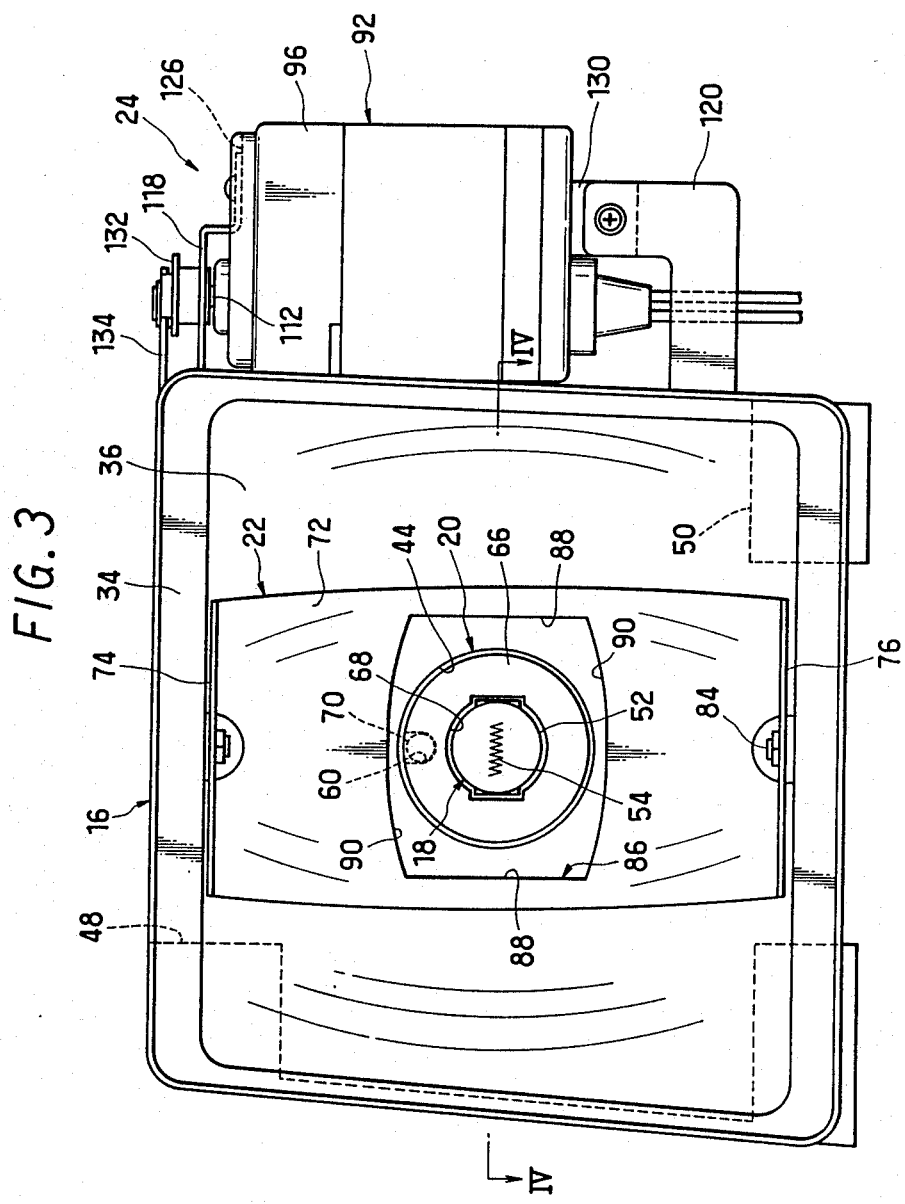
FIG. 3 is a front elevation of the various components of the lamp assembly mounted within the lamp housing which is not shown here.

As shown also in FIGS. 1-4, the movable reflector 22 comprises a reflective portion 72 which is rectangular and elongated vertically as seen in a front view as in FIG. 3, and a pair of mounting flanges 74 and 76 extending forwardly from the top and bottom ends of the reflective portion. The front surface of the reflective portion 72 is in the shape of a paraboloid of revolution, centered about an axis X'—X' which is aligned with the fixed reflector axis X—X when the movable reflector 22 is in the fog lamp position as in FIGS. 2-4. The focus of the reflective portion 72 is the same with that of the reflective portion 36 of the fixed reflector 16. The reflective portion 72 with the pair of mounting flanges 74 and 76 can be an integral pressing of sheet metal, with at least the front face of the reflective portion rendered reflective as by aluminum vapor deposition. It will be observed from FIG. 3 that the movable reflector 22 is approximately the same in vertical dimension with the fixed reflector 16 but considerably less in horizontal dimension than the fixed reflector.

The top and bottom mounting flanges 74 and 76 of the movable reflector 22 have square shaped openings 78 and 80 formed centrally therein. Nonrotatably received in these openings 78 and 80 are pivot pins 82 and 84 in vertical alignment with each other. These pivot pins are further rotatably received in the holes 46 in the flat top and bottom portions 40 and 42 of the fixed reflector 16. Projecting upwardly from the hole 46 in the fixed reflector top portion 40, the upper pivot pin 82 is coupled to the two way drive mechanism 24 to be detailed subsequently.

Thus the movable reflector 22 is supported between the top and bottom portions 40 and 42 of the fixed reflector 16 for rotation about the vertical axis passing the common focus of the fixed and movable reflectors. The bulb filament 54 lies at this common focus.

Formed in the reflective portion 72 of the movable reflector 22 is an aperture 86 for permitting the light bulb 18 to extend forwardly therethrough with clearance. As best seen in FIG. 3, the aperture 86 is approximately rectangular in shape, being defined by a pair of opposed vertical edges 88 and a pair of opposed horizontal edges 90. The geometric center of the aperture 86 is located approximately on the axis X'—X' of the movable reflector 22. The horizontal pair of edges 90 must be sufficiently long to permit the angular displacement of the movable reflector 22 between the two extreme positions (cornering lamp positions) to be set forth presently. The vertical pair of edges 88 should be shorter than the horizontal pair of edges 90 in order to reduce the size of the aperture 86 to a minimum without interfering with the pivotal motion of the movable reflector 22. The maximum distance between the horizontal pair of edges 90 may be slightly more than the diameter of the hole 44 in the fixed reflector 16.

Two Way Drive Mechanism

Figure 4:
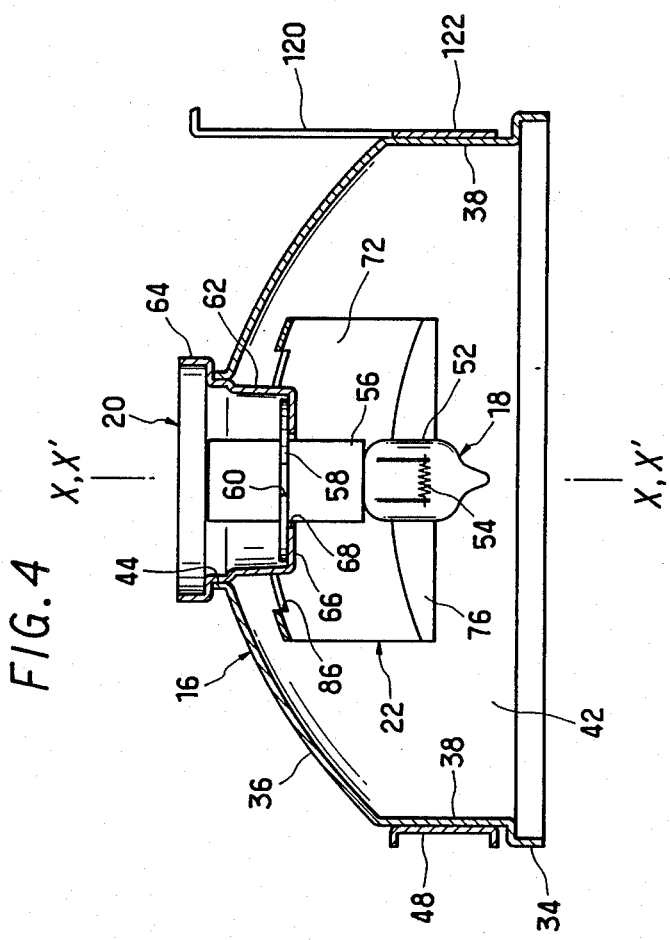
FIG. 4 is a horizontal section taken along the line IV—IV in FIG. 3 and showing in particular the fixed and movable reflector and light bulb of the lamp assembly.
Figure 5:
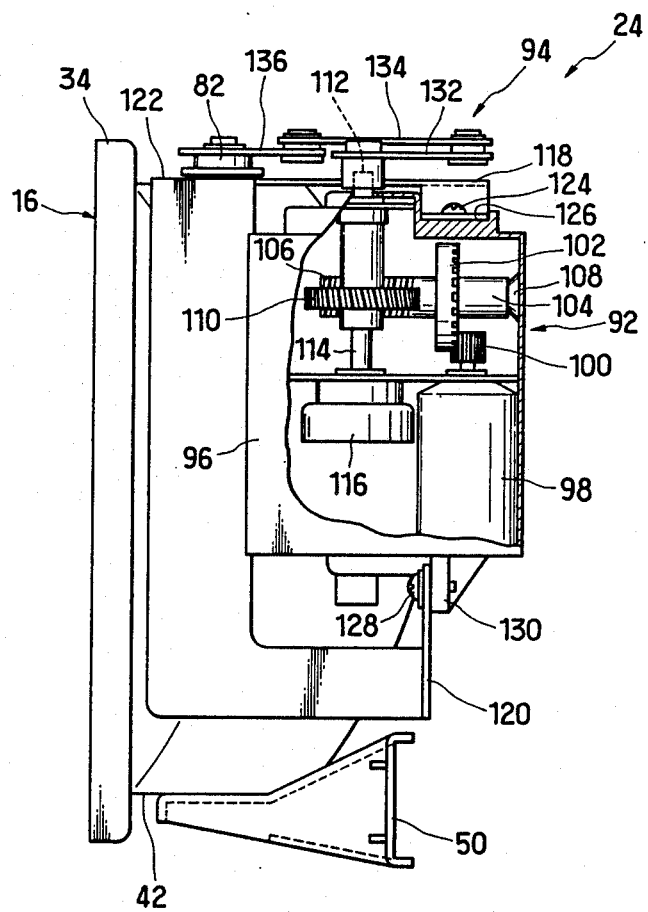
FIG. 5 is a right hand side elevation of the components shown in FIG. 3, with the housing of the drive assembly shown partly broken away to reveal the inner details.
Figure 6:
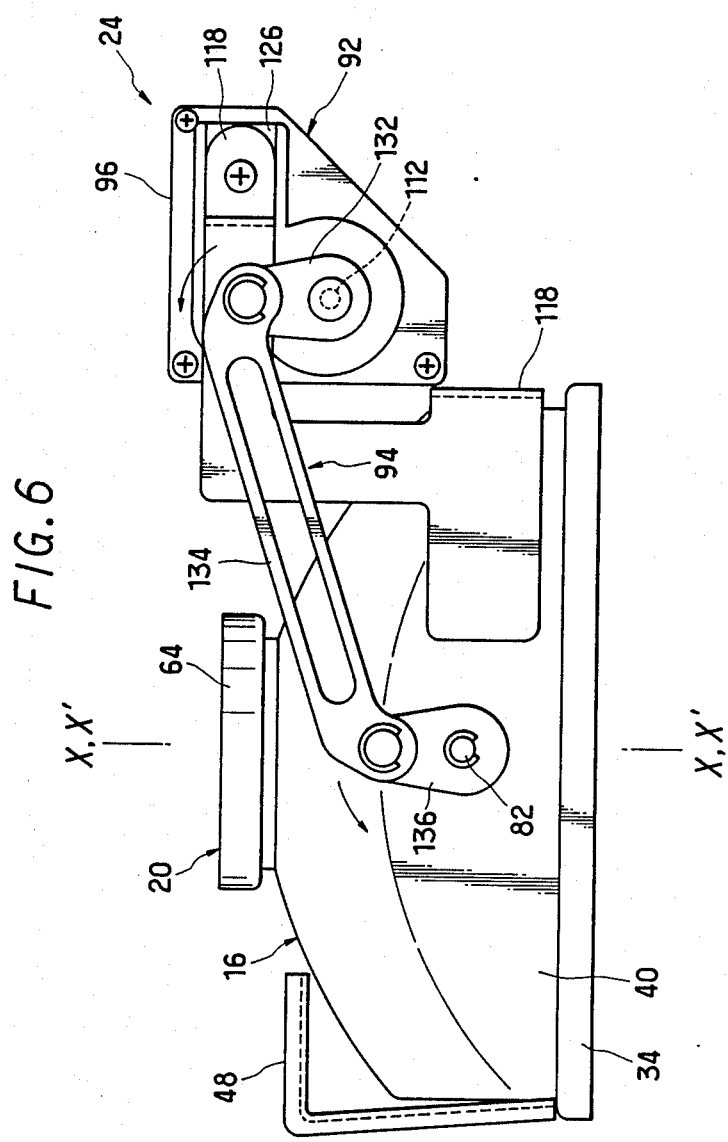
FIG. 6 is a top plan of the lamp assembly components within the lamp housing which is not shown here, the view showing in particular the two way drive mechanism in its state when the movable reflector is in the fog lamp position.
Figure 7:
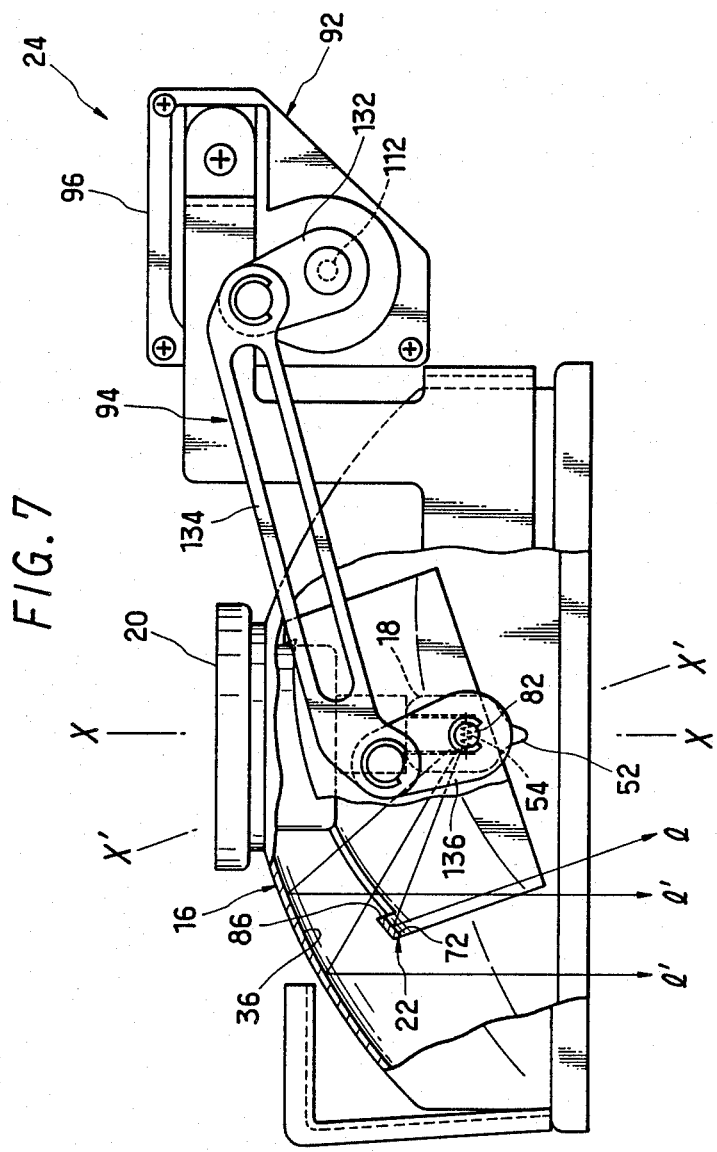
FIG. 7 is a view similar to FIG. 6 except that the fixed reflector is shown partly broken away to reveal the movable reflector and other parts, the view showing the two way drive mechanism in its state when the movable reflector is pivoted to the cornering lamp position.

Reference may be had to FIGS. 5-7 for consideration of the two way drive mechanism 24, although it appears also in FIGS. 1-3. The two way drive mechanism 24 operates to pivot the movable reflector 22 between its fog lamp position, best represented in FIGS. 3 and 4, and either of the two cornering lamp positions which are angularly displaced from the fog lamp position toward both sides of the lamp assembly 10 and one of which is shown in FIG. 7. Whether the movable reflector 22 is pivoted to one or the other of the two possible cornering lamp positions depends upon which side of a motor vehicle the lamp assembly 10 is to be installed on.

When the movable reflector 22 is in the fog lamp position as in FIG. 3 or 4, its optical axis X'—X' (i.e. the axis of the paraboloid of revolution formed by its eflective portion 72) agrees with the lamp axis X—X (i.e. the axis of the fixed reflector 16). Consequently, the fixed and movable reflectors 16 and 22 conjointly produce parallel rays of light from the bulb 18 that are directed forwardly of the lamp assembly 10. This lamp assembly may therefore be used as fog lamp when the movable reflector 22 is in the fog lamp position.

When the movable reflector 22 is pivoted to either of the two cornering lamp positions as in FIG. 7, its axis X'—X' becomes angled with respect to the fixed reflector axis X—X. In this cornering lamp position the movable reflector 22 will reflect part of the light rays from the bulb 18 in the direction of its angled axis X'—X' whereas the fixed reflector will remain directing the remainder of the light rays in the direction of its own axis X—X, that is, forwardly of the lamp assembly 10. Thus, when the motor vehicle is to make a turn, the movable reflector 22 may be pivoted from the fog lamp position to the required cornering lamp position for expanding the range of illumination in the direction of the vehicle turn.

The two way drive mechanism 24 broadly comprises a drive assembly 92 for providing bidirectional driving torque, and a two way drive linkage 94 for transmitting the driving torque of the drive assembly to the movable reflector 22 to cause its pivotal motion between the fog lamp position and a predetermined one of the two cornering lamp positions.

FIG. 5 best illustrates that the drive assembly 92 has an enclosure 96 which is disposed within the lamp housing 12 and on one side of the fixed reflector 16. Mounted within the enclosure 96 is a reversible electric drive motor 98 having a pinion 100 mounted on its armature shaft. The pinion 100 meshes with a crown wheel 102 on a blank portion 104 of a worm 106 rotatably cantilevered at 108 on the inside surface of the enclosure 96. The worm 106 meshes with a worm wheel 110 on an output shaft 112 which partly protrudes upwardly of the enclosure 96 for connection to the movable reflector 22 via the two way drive linkage 94. The output shaft 112 has a downward extension 114 which is coupled to an angle sensor 116 for detecting the angle of rotation of the output shaft 112 in either direction.

The enclosure 96 of the drive assembly 92 is immovably supported between a pair of arms 118 and 120 of a generally U shaped mounting bracket 122 secured to the back of the fixed reflector 16. The upper bracket arm 118 is screwed at 124 to a recessed positioning surface 126 on the top of the drive assembly enclosure 96. The lower bracket arm 120 is screwed at 128 to a mounting flange 130 depending from the bottom of the drive assembly enclosure 96.

The two way drive linkage 94 can connect the output shaft 112 of the drive assembly 92 to the movable reflector 22 in either of two different ways depending upon which of the two possible cornering lamp positions the movable reflector is to be moved to. FIGS. 6 and 7 illustrate one of the two possible connections by way of example. The illustrated connection is for use when the lamp assembly 10 is to be installed on the left hand side of a vehicle, as seen from the vehicle driver, since the resulting cornering lamp position, shown in FIG. 7, of the movable reflector 22 is angularly displaced to the left, also as seen from the vehicle driver, of the fog lamp position.

Included in the two way drive linkage 94 is a first drive arm 132 rigidly coupled at one end to the output shaft 112 of the drive assembly 92 so as to extend right angularly therefrom. The free end of the first drive arm 132 is pivotally coupled to one end of a drive link 134, the other end of which is likewise pivotally coupled to one end of a second drive arm 136. This second drive arm has its other end rigidly coupled to the drive pin 82 which rotatably extends upwardly from the flat top portion 40 of the fixed reflector 16 and which is further joined as aforesaid to the movable reflector 22 for joint rotation therewith. It will be noted that the first and second drive arms 132 and 136 are both oriented in the same direction in this particular embodiment. Therefore, as the first drive arm 132 turns in a counterclockwise direction, for example, from its FIG. 6 position, so does the second drive arm 136. The movable reflector 22 will thus be pivoted to the cornering lamp position of FIG. 7.

Operation

The movable reflector 22 of the combined fog and cornering lamp assembly 10 may be held in the fog lamp position of FIGS. 2–4, with the two way drive linkage 94 in the state of FIG. 6, when the vehicle is traveling straight. When in the fog lamp position, the movable reflector 22 will coact with the fixed reflector 16 to reflect the light from the bulb 18 forwardly of the vehicle. The beam pattern of the lamp assembly 10 will contain no such shadow of the bulb stem 56 as would be created if the bulb 18 were positioned upstandingly as in the prior art.

If the vehicle driver turns the steering wheel counterclockwise to steer the vehicle to the left, an electric control circuit, not shown, will automatically respond to such turn of the steering wheel by causing energization of the drive motor 98, FIG. 5, of the drive assembly 92. The consequent rotation of the drive motor 98 in a forward direction will be transmitted to the output shaft 112 of the drive assembly 92 via the pinion 100, crown wheel 102, worm 106 and worm wheel 110.

The direction of the resulting rotation of the drive assembly output shaft 112 is counterclockwise as viewed in FIG. 6. Accordingly, if the two way drive linkage 94 is connected as shown in FIGS. 6 and 7, the clockwise rotation of the drive assembly output shaft 112 will result in the rotation of the movable reflector 22 in the same direction. The fact that the movable reflector 22 has been pivoted to the cornering lamp position will be detected by the angle sensor 116, FIG. 5, built into the drive assembly 92. The unshown control circuit will respond to the output from the angle sensor 116 by deenergizing the drive motor 98 when the movable reflector 22 reaches the cornering lamp position.

Thus pivoted to the left hand cornering lamp position of FIG. 7, the movable reflector 22 will throw part of the light rays from the bulb 18 along its axis X'—X' which is now angled toward the left hand side of the vehicle, as indicated by the arrow headed line designated 1 in FIG. 7, thereby providing additional road illumination in the direction of the vehicle turn.

FIG. 7 also indicates light rays 1' that pass through the aperture 86 in the movable reflector 22 being held in the cornering lamp position. The fixed reflector 16 will reflect such light rays 1' in a direction parallel to its own axis X—X. Therefore, despite the presence of the aperture 86 in the movable reflector 22, the intensity of the hot zone of the beam pattern will not noticeably differ whether the movable reflector is in the fog lamp position or in the cornering lamp position.

Then, as the steering wheel is manipulated back to the normal position after the vehicle has completed the leftward turn, the control circuit will cause excitation of the drive motor 98 in the reverse direction. The two way drive mechanism 24 will then return the movable reflector 22 from the cornering lamp position to the fog lamp position.

The lamp assembly 10 lends itself to ready adaptation for use on the right hand side of the motor vehicle. To this end the first drive arm 132 of the two way drive mechanism 24 may be coupled to the drive assembly output shaft 112 in a position angularly displaced 180 degrees from that shown in FIG. 6. Then, upon counterclockwise rotation, as viewed in FIG. 6, of the drive assembly output shaft 112, the drive link 134 will exert a pull on the second drive arm 136, so that the movable reflector 22 will pivot in a clockkwise direction to the right hand cornering lamp position. The movable reflector 22 will then provide road illumination toward the right hand side of the vehicle.

It is therefore recommended that a pair of combined fog and cornering lamp assemblies 10 of the same construction except that the two way drive linkages 94 are connected in the two different ways specified, be mounted on both sides of the front end of the motor vehicle. The movable reflectors 22 of both lamp assemblies will then move to the different cornering lamp positions displaced in the opposite directions from their fog lamp position. The resulting light distributions of the lamp assemblies will be greatly expanded toward both sides of the vehicle when the movable reflectors are in the cornering lamp positions. Such lateral expansions of the field of vision will be a particular advantage when the vehicle is traveling on a meandering road over mountains.

Alternative Embodiment

Figure 8:
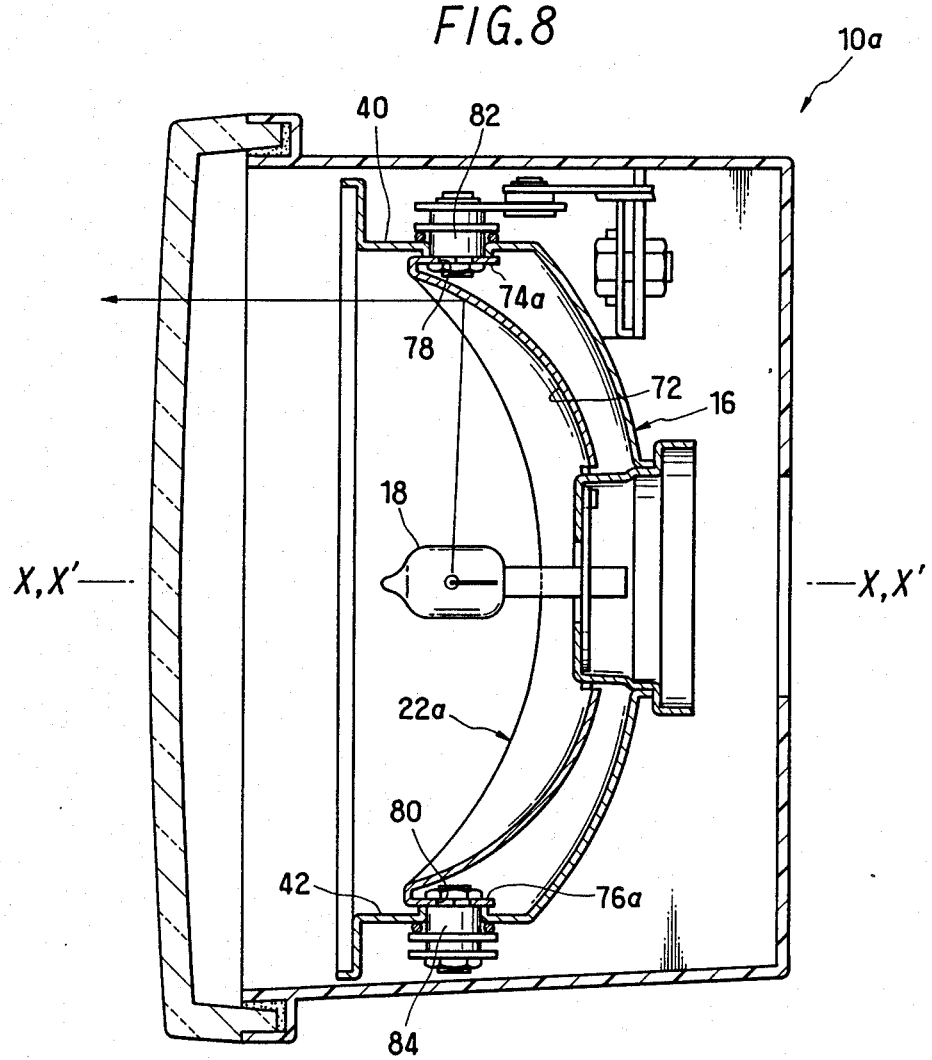
FIG. 8 is a view similar to FIG. 2 but showing an alternative embodiment of the invention.

The alternative fog and cornering lamp assembly 10a of FIG. 8 features a modified movable reflector 22a. The modification resides in a pair of mounting flanges 74a and 76b which are folded back from the top and bottom ends of the reflective portion 72 toward the fixed reflector 16. The mounting flanges 74a and 76a have the openings 78 and 80, respectively, through which extend the pivot pins 82 and 84 for pivotally supporting the movable reflector 22a between the flat top and bottom portions 40 and 42 of the fixed reflector 16. The other details of construction of the modified movable reflector 22a, and of the complete lamp assembly 10a, are as previously set forth in connection with the first disclosed embodiment.

As will be seen by referring back to FIG. 2 in particular, the pair of mounting flanges 74 and 76 of the movable reflector 22 extend forwardly of the reflective portion 72 in the preceding embodiment. Being directly irradiated by the light bulb 18, the mounting flanges 74 and 76 together with the exposed ends of the pivot pins 82 and 84 diffusely reflect the light rays from the bulb. Such undesirable reflection from the mounting flanges is avoided in the FIG. 8 embodiment by folding them back toward the fixed reflector 16.

Various modifications and alternations of the illustrated embodiments may be made in order to conform to design preferences or to the requirements of each specific application of the invention, without departing from the fair meaning or proper scope of the following claims.

What is claimed is:

1. A dual purpose lamp assembly for use, for example, as a combined fog and cornering lamp on a motor vehicle, the lamp assembly comprising:
   (a) a housing:
   (b) a fixed reflector fixedly mounted within the housing and oriented forwardly of the housing;
   (c) a light bulb mounted to the fixed reflector and generally extending forwardly therefrom;
   (d) a movable reflector, smaller than the fixed reflector, disposed forwardly of the fixed reflector and having an aperture formed therein to permit the light bulb to extend therethrough with clearance, the movable reflector being pivotable relative to the fixed reflector between a first position, where the movable reflector coacts with the fixed reflector for reflecting the light rays from the bulb forwardly of the lamp assembly, and a second position where the movable reflector reflects part of the light rays from the bulb toward one side of the lamp assembly; and
   (e) drive means for pivoting the movable reflector between the first and second positions;
   (f) whereby, being mounted to the fixed reflector so as to extend forwardly therefrom through the aperture in the movable reflector, the light bulb hardly intercepts the light rays that have been reflected from the movable reflector.

2. The dual purpose lamp assembly of claim 1 wherein the aperture in the movable reflector is substantially rectangular in shape, and wherein the dimension of the aperture in a direction parallel to the axis of the pivotal motion of the movable reflector is made less than the dimension of the aperture in a direction at right angles with the axis in order to reduce the size of the aperture to a minimum without interfering with the pivotal motion of the movable reflector between the first and second positions.

3. The dual purpose lamp assembly of claim 1 wherein the fixed reflector and the movable reflector are each in the shape of a paraboloid of revolution.

4. The dual purpose lamp assembly of claim 3 wherein the fixed reflector and the movable reflector have a common focus, and wherein the light bulb has a filament located at the common focus of the fixed and movable reflectors.

5. The dual purpose lamp assembly of claim 4 wherein the movable reflector pivots between the first and second positions about an axis passing the common focus of the fixed and movable reflectors.

6. The dual purpose lamp assembly of claim 5 wherein the aperture in the movable reflector is defined by a first pair of opposite edges extending parallel to the axis of the pivotal motion of the movable reflector and by a second pair of opposite edges at right angles with the first pair of opposite edges, and wherein the dimension of the first pair of opposite edges is less than the dimension of the second pair of opposite edges whereby the size of the aperture can be reduced to a minimum without interfering with the pivotal motion of the movable reflector between the first and second positions.

7. The dual purpose lamp assembly of claim 1 wherein the movable reflector comprises a reflective portion having a pair of mounting flanges for use in pivotally supporting the movable reflector, the mounting flanges being bent toward the fixed reflector so as not to reflect the light rays from the bulb.

8. A combined fog and cornering lamp assembly readily adaptable for installation on either side of a motor vehicle, the lamp assembly comprising:
   (a) a housing having an open front end;
   (b) a lens closing the front end of the housing;
   (c) a fixed reflector fixedly mounted within the housing and oriented forwardly of the housing;
   (d) a light bulb mounted to the fixed reflector and generally extending forwardly therefrom;
   (e) a movable reflector, smaller than the fixed reflector, disposed forwardly of the fixed reflector and having an aperture formed therein to permit the light bulb to extend therethrough with clearance, the movable reflector being normally held in a fog lamp position for reflecting the light rays from the light bulb in the forward direction of the lamp assembly in coaction with the fixed reflector, the movable reflector being pivotable about a vertical axis from the fog lamp position to either of two cornering lamp positions, which are angularly displaced from the fog lamp position toward both sides of the lamp assembly, for reflecting part of the light rays from the source toward the opposite sides of the lamp assembly; and
   (f) two way drive means for pivoting the movable reflector between the fog lamp position and either of the two cornering lamp positions depending upon which side of the motor vehicle the lamp assembly is to be installed on;
   (g) whereby, being mounted to the fixed reflector so as to extend forwardly therefrom through the aperture in the movable reflector, the light bulb hardly intercepts the light rays that have been reflected from the movable reflector.

9. The combined fog and cornering lamp assembly of claim 8 wherein the fixed reflector and the movable reflector are each in the shape of a paraboloid of revolution and have a common axis when the movable reflector is in the fog lamp position, and wherein the aperture in the movable reflector has a geometric center located on the common axis of the fixed and movable reflectors.

10. The combined fog and cornering lamp assembly of claim 9 wherein the aperture in the movable reflector is substantially rectangular in shape, being bounded by a first pair of opposite edges extending horizontally and a second pair of opposite edges extending vertically, and wherein the first pair of opposite edges are longer than the second pair of opposite edges.

* * * * *